(12) United States Patent
Lee et al.

(10) Patent No.: US 6,336,122 B1
(45) Date of Patent: Jan. 1, 2002

(54) OBJECT ORIENTED CLASS ARCHIVE FILE MAKER AND METHOD

(75) Inventors: Jeffrey Peter Lee, Oronoco; Clifton Malcolm Nock, Rochester; Schuman M. Shao, Rochester; David Alan Wall, Rochester; James Lee Wright, Rochester, all of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/173,591

(22) Filed: Oct. 15, 1998

(51) Int. Cl.[7] .............................................. G06F 17/30
(52) U.S. Cl. ...................................... 707/204; 709/219
(58) Field of Search ................................ 707/204, 501; 709/219, 225

(56) References Cited

U.S. PATENT DOCUMENTS 5,850,522 A * 12/1998 Wlaschin .................... 709/215
5,966,702 A * 10/1999 Fresko et al. ................. 707/1
5,968,115 A * 10/1999 Trout .......................... 709/107

* cited by examiner

Primary Examiner—Hosain T. Alam
Assistant Examiner—Jean Bolte Fleurantin
(74) Attorney, Agent, or Firm—Martin & Associates, LLC; Derek P. Martin (57) ABSTRACT

A tool referred to herein as an archive maker operates on one or more existing archive files that contain multiple object oriented classes to generate one or more new archive files. The archive maker takes a list of required classes, analyzes those classes in one or more existing archive files to determine any classes upon which they depend, and creates a new archive file with all the required and dependent classes. This allows the classes that are not required to be stripped out of the archive file. The archive maker may also be used to partition an existing archive file into multiple new archive files according to one or more partition criteria. In addition, the archive maker may be used to consolidate multiple existing archive files into a single new archive file.

26 Claims, 6 Drawing Sheets

OBJECT ORIENTED CLASS ARCHIVE FILE MAKER AND METHOD

BACKGROUND OF THE INVENTION

1. Technical Field

This invention generally relates to object oriented programming and more specifically relates to a mechanism and method for creating one or more class archive files from one or more existing class archive files.

2. Background Art

The development of the EDVAC computer system of 1948 is often cited as the beginning of the computer era. Since that time, computer systems have evolved into extremely sophisticated devices, and computer systems may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

Computer systems typically include operating system software that controls the basic function of the computer, and one or more software application programs that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the application software programs designed for high performance computer systems have become extremely powerful. Additionally, software development costs have continued to rise because more powerful and complex programs take more time, and hence more money, to produce.

One way in which the performance of application software programs has been improved while the associated development costs have been reduced is by using object-oriented programming concepts. The goal of using object-oriented programming is to create small, reusable sections of program code known as "objects" that can be quickly and easily combined and re-used to create new programs. This is similar to the idea of using the same set of building blocks again and again to create many different structures. The modular and re-usable aspects of objects will typically speed development of new programs, thereby reducing the costs associated with the development cycle. In addition, by creating and re-using a comprehensive set of well-tested objects, a more stable, uniform, and consistent approach to developing new computer programs can be achieved.

A central concept in object-oriented programming is the "class." A class is a template that defines a type of object. A class outlines or describes the characteristics or makeup of objects that belong to that class. By defining a class, objects can be created that belong to the class without having to rewrite the entire definition for each new object as it is created. This feature of object-oriented programming promotes the reusability of existing object definitions and promotes more efficient use of program code.

Many object oriented programming languages allow packaging multiple classes together in a class archive file. Because an archive file can contain many different classes, a software application that needs to access many of these classes can access all the classes it needs from a single archive file. The use of archive files is especially useful in an Internet environment, where download speed is often a bottleneck to performance.

If a software application (or a downloadable software application known as an applet) requires multiple classes, and if these classes are each individually available for download, the web browser would have to open a connection, download a class, and close the connection for each class that needs to be downloaded. Thus, if sixty classes are required, the web browser must repeat sixty times the sequence of opening a connection, downloading one class, and closing a connection. If the same sixty classes are packaged into an archive file, the web browser only has to make one connection, download the archive file (which contains all sixty classes), and close the connection. Thus, by using an archive file, the web browser has saved the time it would have taken to open and close fifty nine connections.

The current trend in object oriented programming has seen a dramatic increase in the size of class archive files. The more classes that are packaged into a single archive file, the more applications and applets will be able to run using the archive file. However, the growth of the size of archive files, while convenient for software vendors, increases the download time of an application or applet that uses classes contained within the archive file, and increases the space required to store the archive files on disk. Some archive files have become so large that the download time has become excessive, especially considering that only a small percentage of classes in a large archive file is used by any particular application or applet. Thus, the benefit of packaging multiple classes together in an archive file is now being offset by longer download times caused by the tendency to include a relatively large number of classes to support a large number of different applications and applets. Without a mechanism for generating smaller archive files from one or more existing archive files, the computer industry will continue to suffer from archive files that are excessive in size and therefore create delays in loading the archive file for use.

DISCLOSURE OF INVENTION

According to the preferred embodiments, a tool referred to herein as an archive maker operates on one or more existing archive files that contain multiple object oriented classes to generate one or more new archive files. The archive maker takes a list of required classes, analyzes those classes in one or more existing archive files to determine any classes upon which they depend, and creates a new archive file with all the required and dependent classes. This allows the classes that are not required for a particular application or applet to be stripped out of the archive file. The archive maker may also be used to partition an existing archive file into multiple new archive files according to one or more partition criteria. In addition, the archive maker may be used to consolidate multiple existing archive files into a single new archive file.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

The present invention relates to class archive files for object oriented programming languages, such as Java. For those who are not familiar with object oriented programming concepts or the Java programming language, the brief overview below provides background information that will help the reader to understand the present invention.

1. Overview

Object Oriented Technology v. Procedural Technology

Object oriented programming is a method of program implementation in which programs are organized as cooperative collections of objects, each of which represents an instance of some class, and whose classes are all members of a hierarchy of classes united via inheritance relationships. Object oriented programming differs from standard procedural programming in that it uses objects, not algorithms, as the fundamental building blocks for creating computer programs. This difference stems from the fact that the design focus of object oriented programming technology is wholly different from that of procedural programming technology.

The focus of procedural-based design is on the overall process used to solve the problem; whereas the focus of object oriented design is on casting the problem as a set of autonomous entities that can work together to provide a solution. The autonomous entities of object oriented technology are, of course, objects. Object oriented technology is significantly different from procedural technology because problems are broken down into sets of cooperating objects instead of into hierarchies of nested computer programs or procedures.

Thus, a pure object oriented program is made up of code entities called objects. Each object is an identifiable, encapsulated piece of code and data that provides one or more services when requested by a client. Conceptually, an object has two parts, an external object interface and internal object implementation. In particular, all object implementation functions are encapsulated by the object interface such that other objects must communicate with that object through its object interface. The only way to retrieve, process or otherwise operate on the object is through the methods defined on the object. This protects the internal data portion of the object from outside tampering. Additionally, because outside objects have no access to the internal implementation, that internal implementation can change without affecting other aspects of the program.

In this way, the object system isolates the requestor of services (client objects) from the providers of services (server objects) by a well defined encapsulating interface. In the classic object model, a client object sends request messages to server objects to perform any necessary or desired function. The message identifies a specific method to be performed by the server object, and also supplies any required parameters. The server object receives and interprets the message, and can then decide what operations to perform.

There are many computer languages that presently support object oriented programming techniques. For example, Smalltalk, Object Pascal, C ++and Java are all examples of programming languages that support object oriented programming to one degree or another.

Java Programming Language

Java is a modem object oriented programming language designed by Sun Microsystems that has grown in popularity in recent years. Java offers many features and advantages that makes it a desirable programming language to use. First, Java is specifically designed to create small application programs, commonly called "applets," that can reside on the network in centralized servers, and which are delivered to the client machine only when needed. Second, Java is completely platform independent. A Java program can be written once and can then run on any type of platform that contains a Java Virtual Machine (JVM). The JVM model is supported by most computer vendors, thereby allowing a software vendor to have access to hardware and software systems produced by many different companies. Finally, Java is an object oriented language, meaning that software written in Java can take advantage of the benefits of object oriented programming techniques.

Java allows for storing multiple classes in an archive file. In addition to object oriented classes, an archive file may also contain a number of other file types, such as image files, sound files, text files, resource files, etc. A Java archive file is commonly known as a JAR file, due to the jar file extension used for these files. The present invention, while having particular applicability to creating one or more JAR files from one or more existing JAR files, is equally applicable to any archive file for any object oriented programming language that can hold multiple classes. Note that the terms "class archive file" and "archive file" are used interchangeably herein to denote an archive file that contains object oriented classes.

2. Detailed Description

According to a preferred embodiment of the present invention, an archive maker creates one or more class archive files from one or more existing class archive files.

This allows a large archive file to be condensed down to a much smaller size, with the new archive file containing only the classes needed by a particular application or applet. In addition, the archive maker can partition a large archive file into smaller archive files. Finally, the archive maker can also be used to consolidate multiple archive files into a larger archive file. The archive maker thus provides a very flexible tool for generating new archive files from existing archive files.

Figure 1:
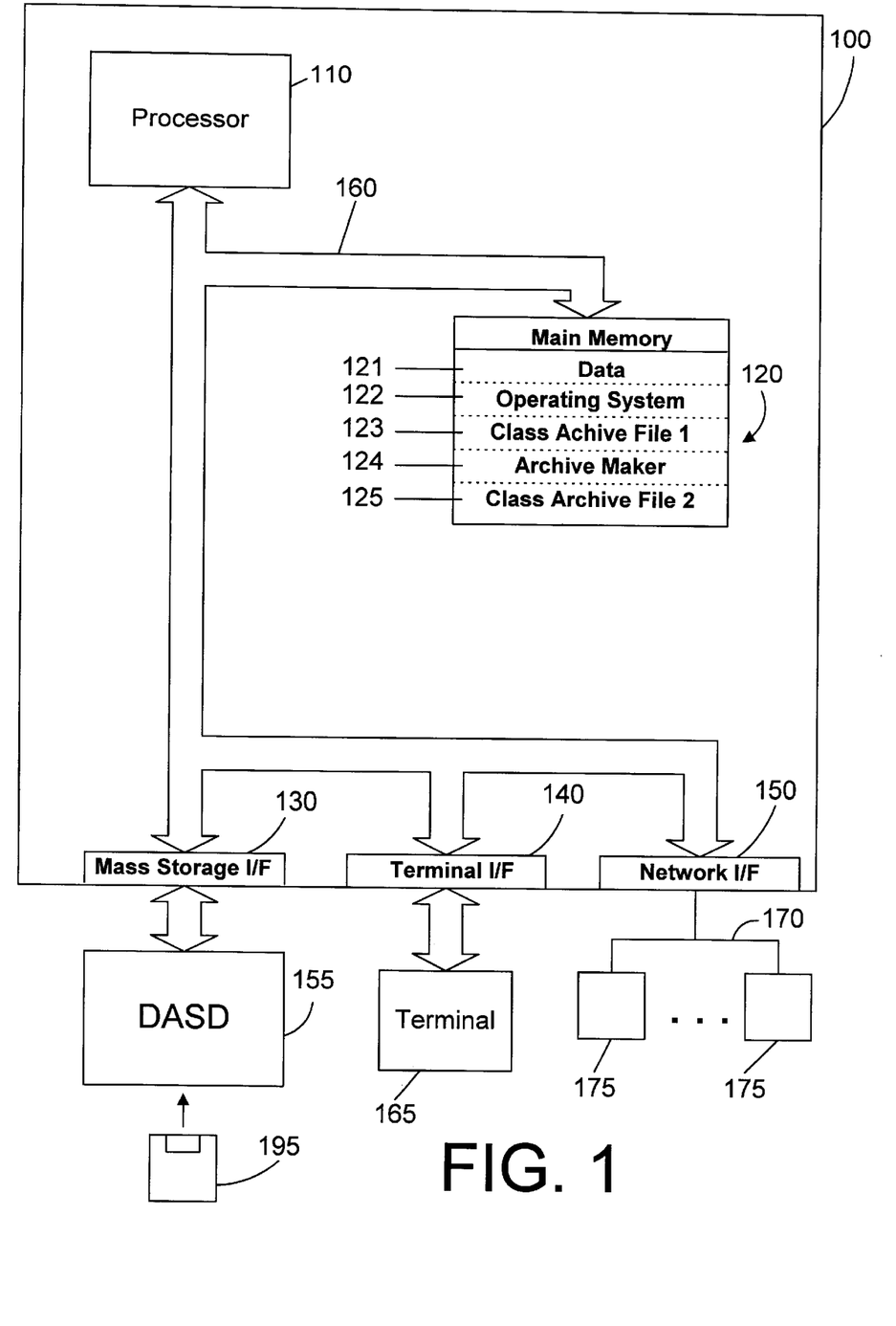
FIG. 1 is a block diagram of an apparatus in accordance with a preferred embodiment of the present invention.

Referring to FIG. 1, a computer system 100 in accordance with the preferred embodiment is an enhanced IBM AS/400 computer system. However, those skilled in the art will appreciate that the mechanisms and apparatus of the present invention apply equally to any computer system, regardless of whether the computer system is a complicated multi-user computing apparatus or a single user workstation. As shown in FIG. 1, computer system 100 comprises a processor 110 connected to a main memory 120, a mass storage interface 130, a terminal interface 140, and a network interface 150. These system components are interconnected through the use of a system bus 160. Mass storage interface 130 is used to connect mass storage devices (such as a direct access storage device 155) to computer system 100. One specific type of direct access storage device is a floppy disk drive, which may store data to and read data from a floppy diskette 195.

Main memory 120 in accordance with the preferred embodiments contains data 121, an operating system 122, a class archive file 123, an archive maker 124, and an archive file 125. Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, first archive file 123, archive maker 124, and second archive file 125 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Data 121 represents any data that serves as input to or output from any program in computer system 100. Operating system 122 is a multitasking operating system known in the industry as OS/400; however, those skilled in the art will appreciate that the spirit and scope of the present invention is not limited to any one operating system. Operating system 122 preferably supports an object oriented programming environment such as that provided, for example, by the Java programming language.

First archive file 123 is an existing archive file that contains object oriented classes that may be accessed by a computer program while the computer program is running. An existing archive file, such as first archive file 123, is also referred to herein as a "source" archive file to indicate that the archive file is the source of classes that are processed to generate one or more new archive files. Each new archive file is also referred to herein as a "destination" archive file to indicate that the new archive file is the destination for the classes processed from the source archive file(s).

Archive maker 124 is a tool that generates a new archive file 125 from the old archive file 123. In the preferred embodiments, archive maker 124 is implemented using object oriented programming techniques. However, an object oriented implementation of archive maker 124 is not necessary, and other programming techniques for implementing archive maker 124 are expressly within the scope of the present invention.

New archive file 125 is an archive file created by archive maker 124 that contains object oriented classes, at least one of which was contained in the existing archive file 123. There are numerous ways for archive maker 124 to generate new archive file 125 from old archive file 123, some of which are disclosed herein. Alternative embodiments not specifically disclosed here are also within the scope of the present invention.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, terminal interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces (called input/output processors in AS/400 terminology) that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent (i.e., dumb) terminals or fully programmable workstations, are used to allow system administrators and users to communicate with computer system 100. Note, however, that while terminal interface 140 is provided to support communication with one or more terminals 165, computer system 100 does not necessarily require a terminal 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

It is also important to point out that the presence of network interface 150 within computer system 100 means that computer system 100 may engage in cooperative processing with one or more other computer systems or workstations on network 170. Of course, this in turn means that the programs and data shown in main memory 120 need not necessarily all reside on computer system 100. For example, one or more portions shown in main memory 120 may reside on another system and engage in cooperative processing with one or more objects or programs that reside on computer system 100. This cooperative processing could be accomplished through use of one of the well known client-server mechanisms such as remote procedure call (RPC).

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 195 of FIG. 1) and CD ROM, and transmission type media such as digital and analog communications links.

Figure 2:
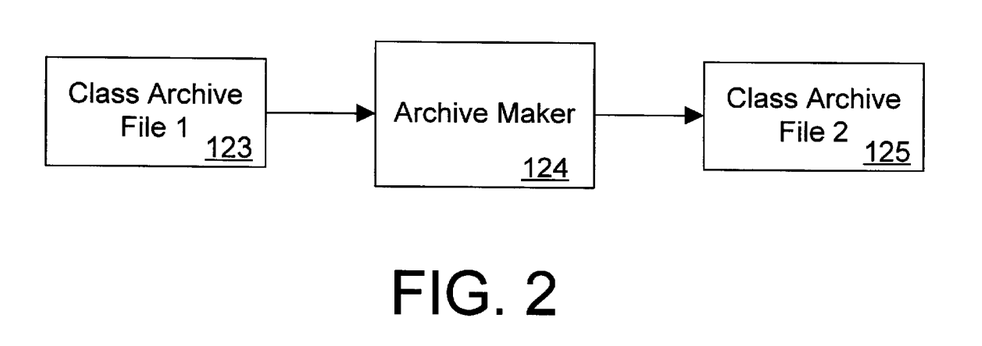
FIG. 2 is a block diagram showing the archive maker of FIG. 1 generating a new class archive file from an existing class archive file.

Referring now to FIG. 2, a simple block diagram illustrates that archive maker 124 takes an existing class archive file 123 as input (source) and generates a new class archive file 125 as output (destination). One suitable method for archive maker 124 to generate new archive file 125 in accordance with a first embodiment is shown as method 300 of FIG. 3. First, some client or user invokes the archive maker 124, specifying one or more existing archive files 123 and specifying the class names that are stored in the one or more existing archive files that must be included in the new archive file 125 (step 310). Next, archive maker 124 determines the dependencies for the classes specified in step 310 and for all their dependent classes (step 320). The checking of dependencies in step 320 includes the steps of checking for direct references to other classes, and checking for indirect references to other classes as well. A direct reference to another class occurs when a class explicitly invokes another class. Archive maker 124 parses the contents of each class file in the source archive file 123, looking in the "constant pool" in each class for references to other class names. Thus, for all the classes specified in step 310, the code in the existing archive file 123 for those classes is analyzed to determine which classes are invoked by the classes specified in step 310.

Figure 3:
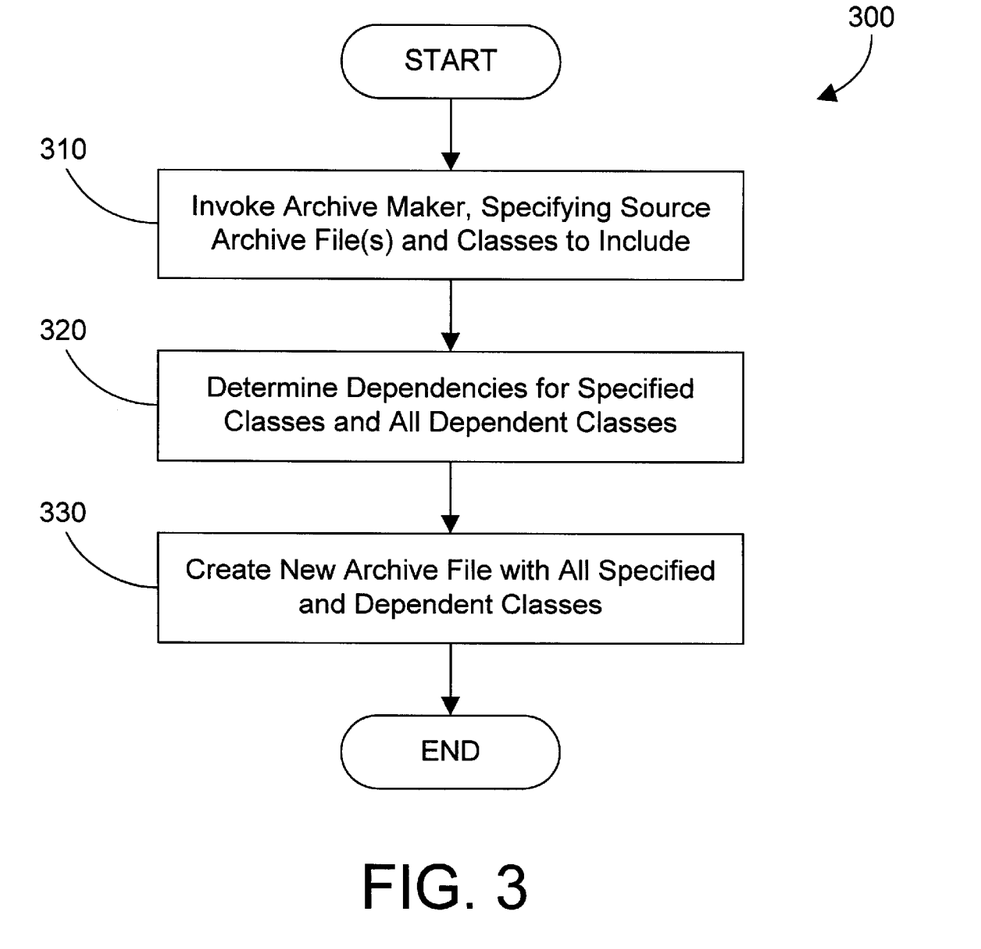
FIG. 3 is a flow diagram of a method for creating a new archive file from classes in an existing archive file in accordance with a preferred embodiment of the present invention.

Classes may also be dynamically loaded by invoking a method and passing a string as a parameter, where the string contains the class name. When an application or applet dynamically loads a class, the class name will not appear directly in the constant pool. Detecting these indirect class references requires an analysis of the text strings in all of the classes specified in step 310. If a text string includes the name of a class that is in the archive file, this is assumed to be a reference to a class that is dynamically loaded. The detection of class references for classes that are dynamically loaded is made easier if all of the classes in an existing archive file 123 are identified with a common identifier, such as a prefix that is the same for all classes in the archive file.

A first class that invokes a second class, either directly or by dynamically loading that class, is said to be dependent on the second class, and the second class is referred to herein as a "dependent class". Once all the dependent classes are determined for the classes specified in step 310, all of the dependent classes are checked for dependencies. This process continues down the hierarchy of classes until all classes that are dependent on any other class are determined. Of course, other equivalent methods may be used to determine the list of specified and dependent classes. For example, a specified class could be analyzed, and any classes it references could then be analyzed, and so on, in a recursive manner, until all dependent classes for the specified class have been discovered. This process could then be repeated for each specified class. While the preferred embodiments for step 320 have been described above, there are numerous different ways of determining dependencies among classes in a class archive file, and step 320 is intended in its broadest sense to include any and all ways of determining dependencies among classes in a class archive file.

Once the dependent classes have been determined in step 320, the archive maker 124 creates a new archive file 125 that includes all of the classes specified in step 310 and all the dependent classes determined in step 320. This new archive file 125 includes only those classes that are dependent on each other, and will likely be considerably smaller than the existing archive file 123.

Figure 4:
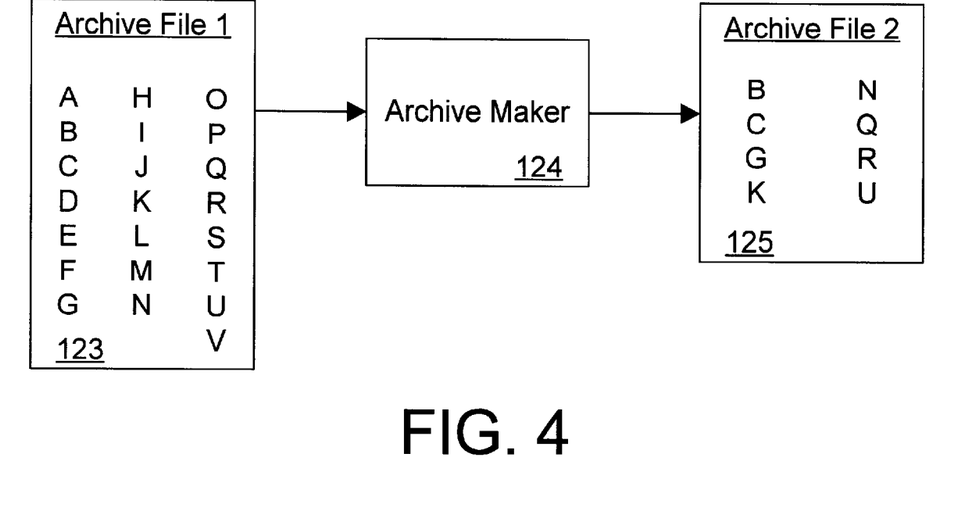
FIG. 4 is a block diagram showing the generation of a new archive file that contains a subset of classes in the existing archive file according to the method of FIG. 3.

A specific example illustrating method 300 of FIG. 3 is shown in FIG. 4. The existing archive file 123 includes many classes, represented by the labels A through V alphabetically. Archive maker 124 is invoked, specifying the source archive file 123 to use and specifying which classes in archive file 123 must be included (step 310). We assume that classes B, G and U are the classes specified in step 310. Archive maker 124 then checks dependencies (step 320). We assume that classes C, K, N, Q and R are dependent classes. Archive maker 124 then creates a new archive file 125 (step 330) that contains all specified and dependent classes, namely B, C, G, K, N, Q, R, and U. We see from this example that the new destination archive file 125 is substantially smaller than the source archive file 123. This smaller file can be downloaded faster and will occupy less storage space than existing archive file 123.

Figure 5:
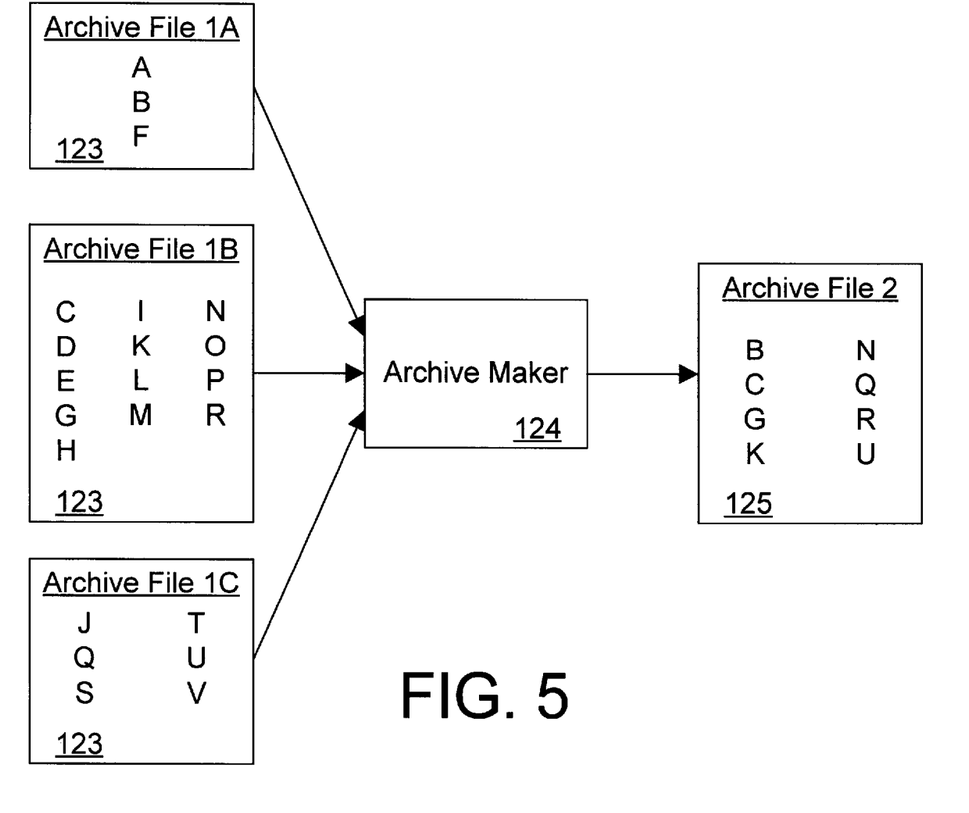
FIG. 5 is a block diagram showing the generation of a new archive file from multiple existing archive files according to the method of FIG. 3.

In addition to creating a new smaller archive file from a larger existing archive file, archive maker 124 may also operate on multiple source archive files 123. Referring to FIG. 5, if the classes of the existing archive file 123 of FIG. 4 were spread across three different existing archive files labeled 1A, 1B and 1C in FIG. 5, archive maker 124 would produce the same new archive file 125. The primary difference between the two examples in FIGS. 4 and 5 is that in step 310, instead of specifying a single source archive file (for FIG. 4), multiple source archive files are specified (for FIG. 5).

Figure 6:
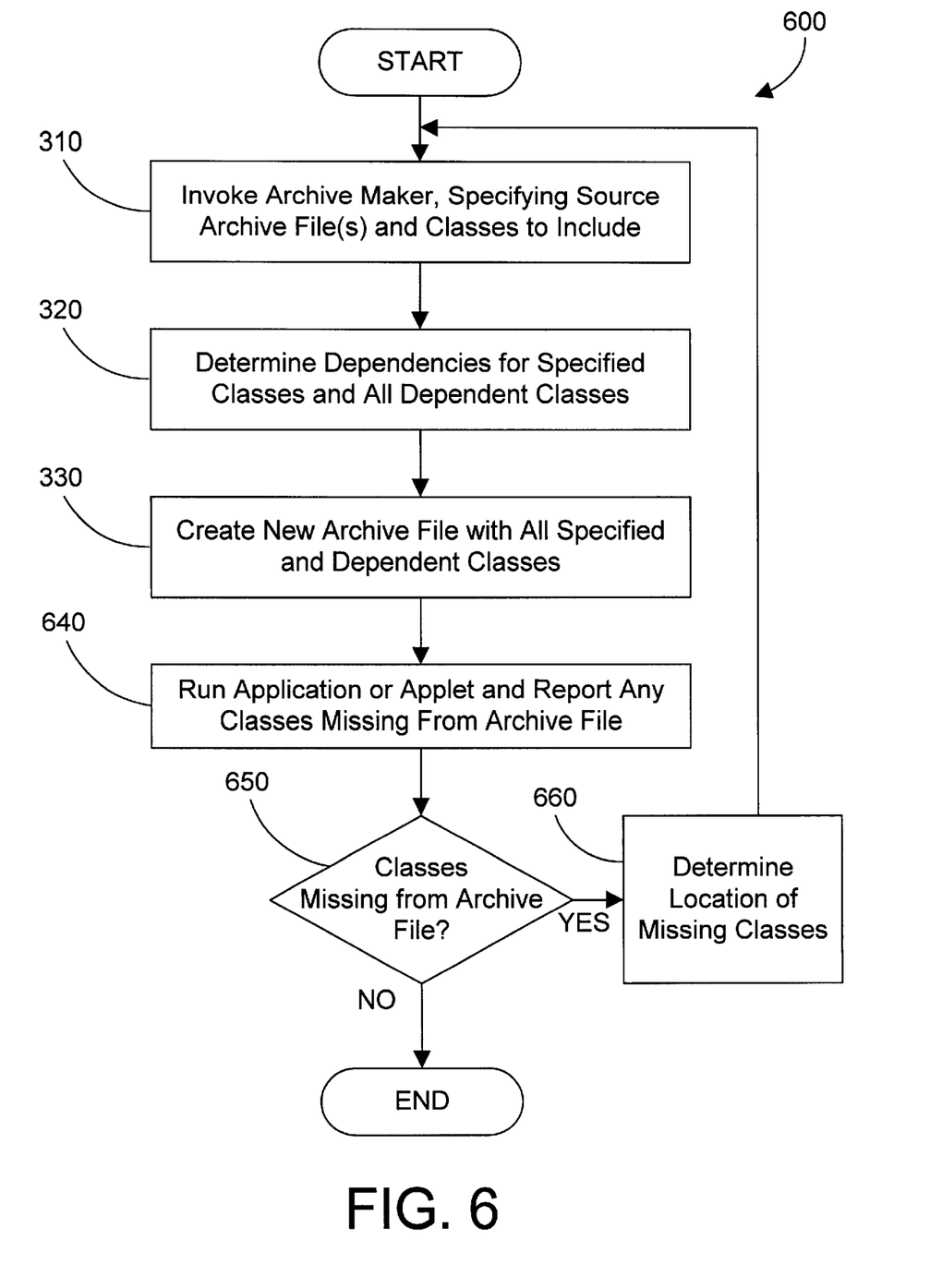
FIG. 6 is a flow diagram of a method for generating a new archive file from an existing archive file, testing an application to assure that all needed classes are included in the new archive file, and iterating until the new archive file contains all needed classes.

One potential problem with method 300 is that there may be classes that are needed that do not exist in the source archive file. For example, if a first archive file has classes that reference classes in a second archive file, but only the first archive file is specified in step 310, the archive maker 124 will determine that there are dependencies on classes that do not exist in the existing archive file 123. To account for this situation, an enhancement to method 300 of FIG. 3 is shown as method 600 in FIG. 6. Steps 310, 320 and 330 are identical to the same steps in FIG. 3. After the new archive file is created, however, the application or applet is run (step 640) to determine if there are any classes missing from the new archive file. If no classes are missing (step 650=NO), the archive file is complete, and method 600 ends. If, however, there are one or more classes that were invoked but unavailable in the new archive file during the execution of the application or applet in step 640 (step 650=YES), method 600 determines the location of the missing classes (step 660). This step may require human intervention by prompting the user with an error message, and requiring that the user enter a path name to an archive file that contains the missing class or classes. In the alternative, this step may be automated if method 600 knows where to look for missing classes. Method 600 then repeats step 310, specifying the source archive files (including any archive file that contains missing classes), and the process is repeated until no classes are missing (step 650=NO). Method 600 thus provides a dynamic system that not only creates a new archive file from an existing archive file, but also tests to make sure the new archive file works as it should. Note that method 600 could even compensate for a problem in the archive maker identifying dependent classes in step 320. If a referenced class is not detected for some reason, this class would be a missing class in step 650, and step 660 could determine that the missing class is in the existing archive file that was initially specified, and the missing file could then be included in the list of classes to include in the next iteration of step 310.

Figure 7:
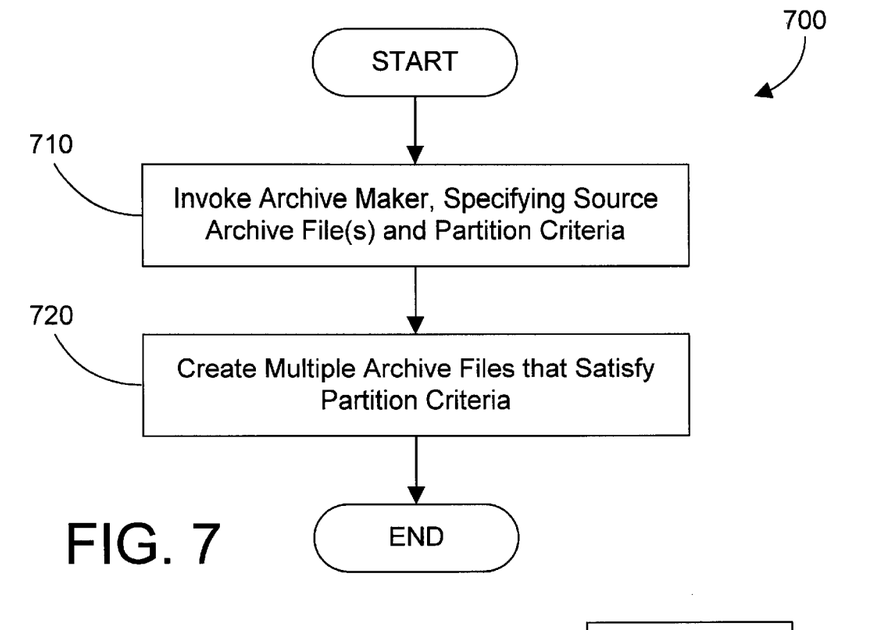
FIG. 7 is a flow diagram of a method for partitioning an existing archive file into multiple smaller archive files in accordance with a preferred embodiment of the present invention.
Figure 8:
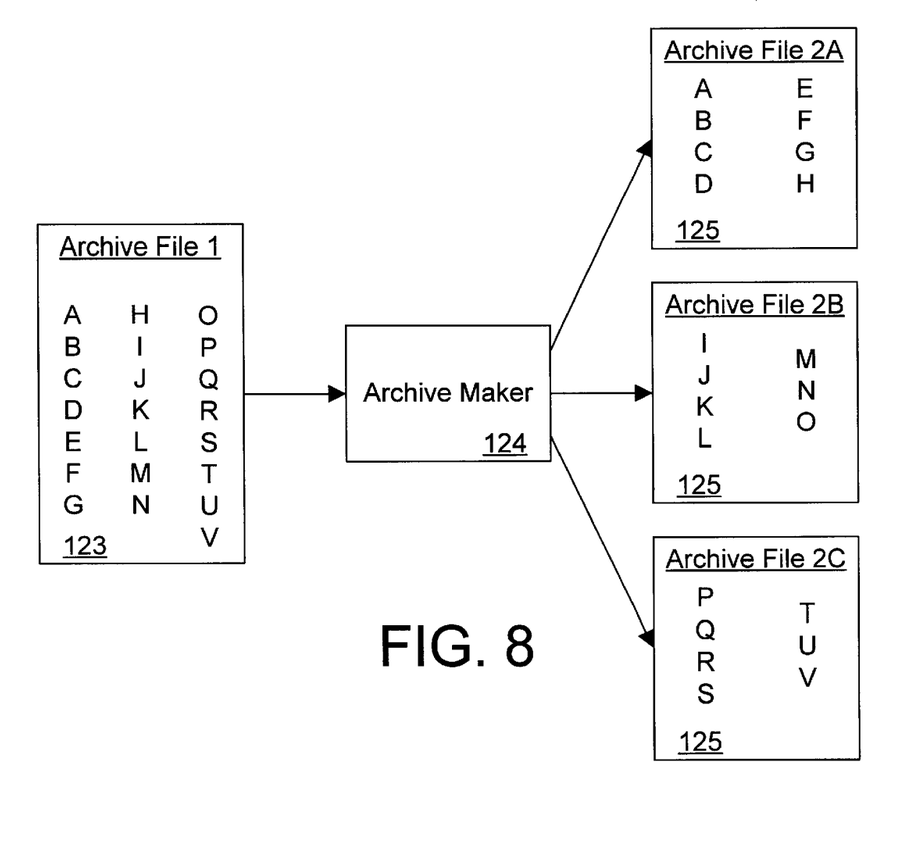
FIG. 8 is a block diagram showing the partitioning of an existing archive file into smaller archive files in accordance with the method of FIG. 7.

Archive maker 124 can also be used to partition an existing archive file into smaller new archive files. Referring to FIG. 7, a method 700 begins by specifying one or more source archive files along with one or more suitable partition criteria (step 710). Next, the archive maker creates multiple new archive files that satisfy the partition criteria (step 720). The term "partition criteria" is defined herein to mean any suitable criterion or criteria that determines how the existing archive file is partitioned. One suitable example of a partition criterion is the maximum size of the new archive files. For example, if archive files need to be stored on 1.44 MB floppy disks, a maximum archive file size of 1.44 MB could be specified, and each new archive file would then fit on a floppy disk. Referring to FIG. 8, we assume that in step 710 of FIG. 7, the existing archive file 123 is specified, and that the partition criterion is a maximum file size for the new archive files. Archive maker 124 begins at the beginning of the existing archive file, selects a sequential number of classes that is less than the maximum file size, and writes these classes to a new archive file 125. Thus, assuming that classes A through H are collectively smaller than the maximum file size, new archive file 125 labeled 2A would be created. Archive maker 124 then continues this process, writing the next group of classes to the new archive file 125 labeled 2B. Archive maker 124 continues the same process, writing the remaining classes to the new archive file 125 labeled 2C. Archive maker 124 thus succeeds at creating multiple new archive files 125 that are each less than the maximum file size specified in step 710 of FIG. 7.

The maximum file size is described above as one suitable partition criterion. Of course, may other suitable partition criteria could be used. For example, a minimum or maximum number of classes to include in each new archive file 125 would be a suitable partition criteria. Classes that have a particular identifier in their class names could be partitioned together. The present invention expressly extends to any and all suitable partition criteria that could be used to partition an existing archive file 123 into multiple new archive files 125.

Figure 9:
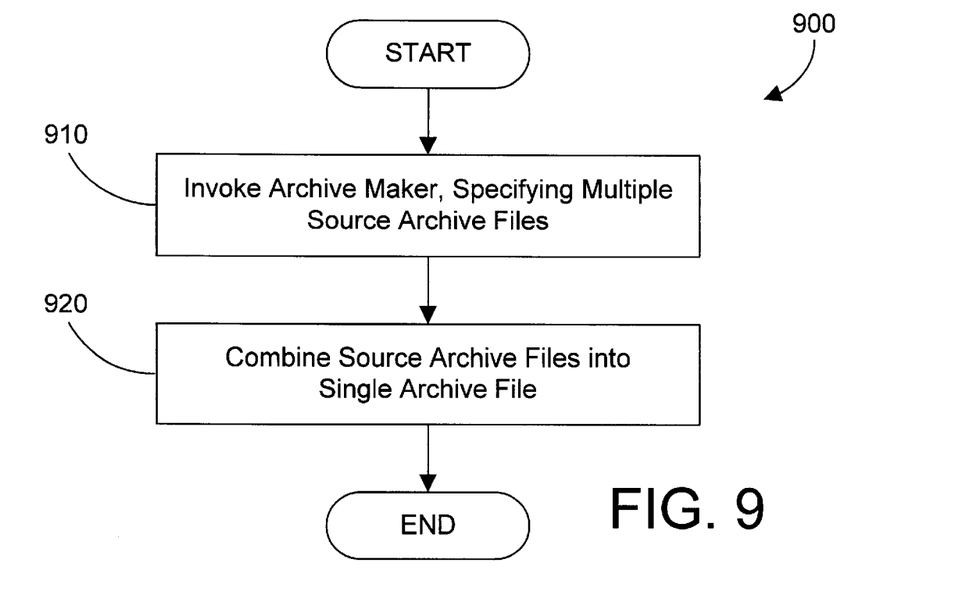
FIG. 9 is a flow diagram of a method for combining multiple existing archive files into a single archive file in accordance with a preferred embodiment of the present invention.
Figure 10:
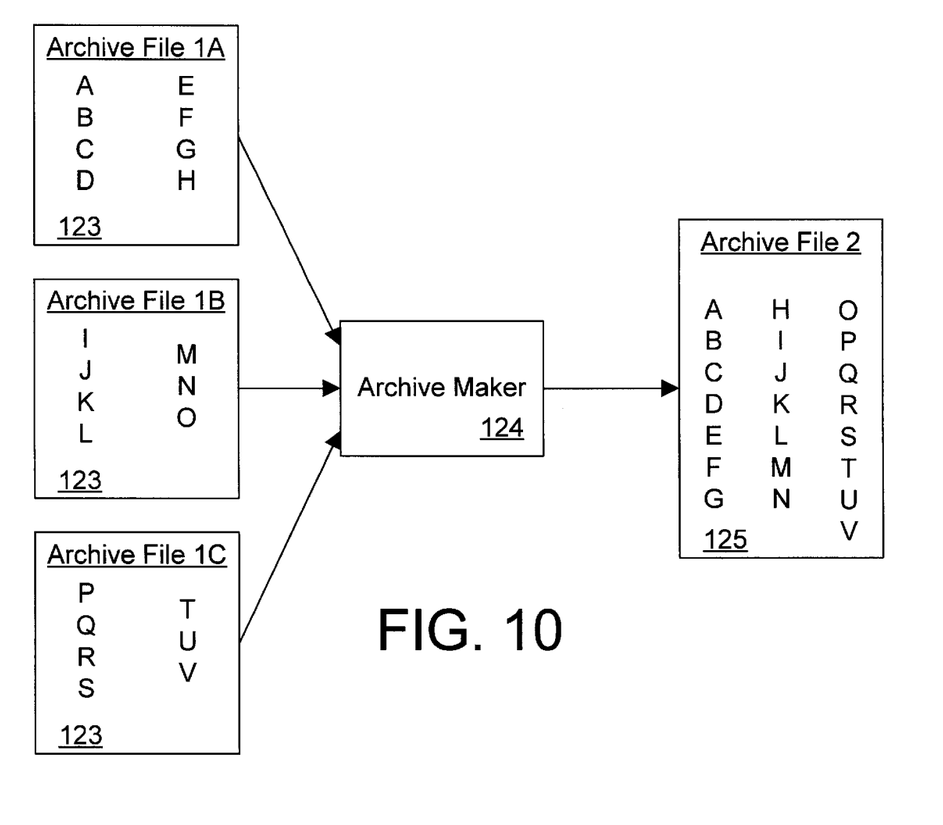
FIG. 10 is a block diagram showing the generation of one new archive file from multiple existing archive files in accordance with the method of FIG. 9.

Archive maker 124 can also be used to combine multiple existing archive files into a single new archive file. Referring to FIG. 9, method 900 begins by invoking the archive maker, specifying multiple existing archive files (step 910). The archive maker the combines the specified existing archive files into a single new archive file (step 920). This method is illustrated in FIG. 10, and can be thought of as the reverse operation illustrated in FIG. 8. We assume that multiple archive files 123, labeled 1A, 1B and 1C are specified when the archive maker is invoked in step 910. Archive maker 124 then creates a new archive file 125 from the classes contained in all the specified existing archive files. Thus, the new archive file 125 is a superset of all the classes in all of the specified existing archive files 123.

The archive maker 124 is invoked by issuing a suitable command to the archive maker 124. Examples of suitable commands in accordance with the preferred embodiments are described below. Method 300 of FIG. 3 is initiated by issuing a GENERATE command to the archive maker 124. Method 700 of FIG. 7 is initiated by issuing a PARTITION command to the archive maker 124. In similar fashion, method 900 of FIG. 9 is initiated by issuing a CONSOLIDATE command to the archive maker 124. Note that each of these commands may include one or more options, discussed in more detail below.

A "source" option is specified by adding a "-s" tag to the command line after the command, and by including the name of one or more archive files, separated by commas, that will be the source (or existing) archive file or files used to generate one or more new archive files. A "destination" option is specified by adding a "-d" tag to the command line after the command, and by including a file name for the new archive files that are to be generated. If no destination is given, a default name is generated by appending the text "new" to the base name of the source file. If multiple destination files are generated, each will include a numeric suffix to indicate the order of their creation. Thus, if the destination file is "result.jar", and three new archive files are generated, these three files will be named result1.jar, result2.jar, and result3.jar.

A "required" option is specified by adding a "-r" tag to the command line after the command, and by including the name of one or more classes in the source archive file, separated by commas, that must be included in the destination archive file. Note that this option supports wildcards, so classes that all share a common prefix may be selected as required classes by indicating the common prefix followed by a wildcard, such as "*".

An "extract" option is specified by adding a "-x" tag to the command line after the command, specifying a path to a base directory that will hold the extracted classes. This option allows the archive maker to store the resulting classes in a base directory instead of in an archive file. The extract option overrides the destination option. This option allows a user to collect classes for a customized archive file by extracting classes from different archive files into the base directory. If no base directory is specified, the classes are stored in the current directory. Once extracted, the classes in the base directory could then be written to an archive file. Note that similar function is available by issuing the CONSOLIDATE command to the archive maker 124.

A "language" option is specified by adding a "-l" tag to the command line after the command, and by specifying the language or languages for the messages that should be included in the destination archive file. This option allows stripping out messages in languages that are not of interest.

A "verbose" option is specified by adding a "-v" tag to the command line after the command. The verbose option causes additional information output to be generated. A "maxsize" option is specified by adding a "-maxsize" tag to the command line after the command. For a GENERATE or PARTITION command, the maxsize option causes multiple new archive files to be generated if the size of the output exceeds the specified maximum size.

With the commands and tags defined above, we can now initiate each of the methods of the preferred embodiments using this command syntax. For example, let's assume we have a source archive file named "my_archive.jar" and we want to generate a destination archive filed named new_archive.jar that is a subset of my_archive.jar, and we want to specify that class1 and class4 are required classes. The operation representative of FIG. 4 is initiated by issuing the following command to the archive maker 124:

GENERATE -s my_archive.jar -d new_archive.jar -r class1, class4

Now let's assume we have three source archive files named my_archive1.jar, my_archive2.jar, and my_archive3.jar, and we want to specify that class1 and class4 are required archive files. The operation representative of FIG. 5 is initiated by issuing the following command:

GENERATE -s my_archive1.jar, my_archive2.jar, my_archive3.jar -d new_archive.jar -r class1, class4

Let's now assume that we have a single source archive file named my_archive.jar, and we want to partition this archive file into multiple smaller files, no larger than 1.44 MB, with the name "result.jar". This can be accomplished using method 700 of FIG. 7, which is initiated by issuing the following command:

PARTITION -s my_archive.jar -d result.jar -maxsize 1.44 MB

Note that the newly-generated archive files will have the names result1.jar, result2.jar, etc.

Now let's assume we have three source archive files named my_archive1.jar, my_archive2.jar, and my_archive3.jar, and we want to consolidate these three archive files into a single archive file named result.jar. This can be accomplished using method 900 of FIG. 9, which is initiated using the following command:

CONSOLIDATE -s my_archive1.jar, my_archive2.jar, my_archive3.jar -d result.jar

Note that the extract, language, and verbose tags could be suitably added to the commands above as appropriate.

An archive maker and associated methods in accordance with the present invention provide a tool for creating one or more new archive files from one or more existing archive files. Such a tool is extremely useful by allowing a large archive file to be shrunk down to only the minimum size required by the classes that are actually needed by a particular application or applet.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. For example, while method 700 is described as partitioning a single source archive file, it is equally within the scope of the disclosed embodiment to partition multiple source archive files by specifying the multiple source archive files in the PARTITION command. In addition, while the commands and syntax for invoking the archive maker 124 is discussed above in terms of required class files, other file types that are stored in archive file 123 (such as image files, sound files, etc.) may also be specified as required files in the new archive file 125. Furthermore, other commands and parameters for the archive maker 124 are also possible within the scope of the present invention. For example, a SUBSTITUTE command might specify an archive file and one or more specified files in the archive file that are to be replaced by other specified files. The CONSOLIDATE command might take an archive file and one or more specified files as input, and consolidate the specified files into the archive file. These and other variations are within the scope of the present invention.

We claim:

1. An apparatus comprising:
    at least one processor;
    a memory coupled to the at least one processor;
    at least one source archive file residing in the memory, each source archive file including a plurality of object oriented classes; and
    an archive maker residing in the memory and executed by the at least one processor, the archive maker receiving a specification of classes in the at least one source archive file, the archive maker determining dependencies among the specified classes and remaining classes in the at least one source archive file, wherein two classes are dependent on each other if one of the two classes invokes the other of the two classes, the archive maker generating at least one new archive file that includes the specified classes and the dependent classes.

2. The apparatus of claim 1 wherein the at least one new archive file comprises a single new archive file that is a subset of the plurality of object oriented classes in the at least one source archive file.

3. The apparatus of claim 2 wherein the archive maker determines dependencies among the remaining classes in the at least one source archive file, and includes all dependent classes in the single new archive file.

4. The apparatus of claim 1 wherein the archive maker processes a plurality of source archive files to generate a single new archive file that is a subset of the plurality of classes in the plurality of source archive files.

5. The apparatus of claim 1 wherein the archive maker partitions a single source archive file into a plurality of new archive files according to at least one predetermined partition criterion.

6. The apparatus of claim 5 wherein the at least one predetermined partition criterion includes maximum file size for each of the plurality of new archive files.

7. An apparatus comprising:
    at least one processor;
    a memory coupled to the at least one processor;
    an archive maker residing in the memory and executed by the at least one processor;
        the archive maker processing at least one source archive file comprising a plurality of object oriented classes, the archive maker generating a single new archive file that is a subset of the plurality of classes in the at least one source archive file;
        the archive maker partitioning a single source archive file into a plurality of new archive files according to at least one predetermined partition criterion; and
        the archive maker consolidating a plurality of source archive files into a single new archive file.

8. A method for generating at least one new archive file, the method comprising the steps of:
    (A) processing at least one source archive file, the at least one source archive file including a plurality of object oriented classes, the processing of the at least one source archive file including the steps of:
        (A1) specifying at least one of the plurality of classes to include in the at least one new archive file;
        (A2) determining dependencies between the specified classes and remaining classes in the at least one source archive file, wherein two classes are dependent on each other if one of the two classes invokes the other of the two classes; and
    (B) writing the specified classes and the dependent classes to the at least one new archive file.

9. The method of claim 8 wherein step (A) further comprises the steps of:
    (A3) determining dependencies between the remaining classes in the at least one source archive file.

10. The method of claim 8 wherein the at least one new archive file comprises a single archive file that is a subset of the plurality of classes in the at least one source archive file.

11. The method of claim 8 wherein the at least one source archive file comprises a plurality of source archive files, and wherein the at least one new archive file comprises a single new archive file that is a subset of the plurality of classes in the plurality of source archive files.

12. The method of claim 8 wherein steps (A) and (B) partition a single source archive file into a plurality of new archive files according to at least one predetermined partition criterion.

13. The method of claim 12 wherein the at least one predetermined partition criterion includes maximum file size for each of the plurality of new archive files.

14. A method for generating at least one new archive file, the method comprising the steps of:

(A) processing at least one source archive file, the at least one source archive file including a plurality of object oriented classes; and (B) writing at least one of the plurality of classes to the at least one new archive file;

(C) executing an object oriented computer program that references at least one class stored in the at least one new archive file;

(D) determining whether any classes required by the object oriented computer program are missing from the at least one new archive file;

(E) determining the location of missing classes, if any, in the at least one new archive file; and (F) if there are missing classes, repeating steps (A) and (B), step (A) processing at least one archive file that contains at least one missing class.

15. A program product comprising:

an archive maker that receives a specification of classes in at least one source archive file that includes a plurality of object oriented classes, the archive maker determining dependencies among the specified classes and remaining classes in the at least one source archive file, wherein two classes are dependent on each other if one of the two classes invokes the other of the two classes, the archive maker generating at least one new archive file that includes the specified classes and all dependent classes; and signal bearing media bearing the archive maker.

16. The program product of claim 15 wherein the signal bearing media comprises recordable media.

17. The program product of claim 15 wherein the signal bearing media comprises transmission media.

18. The program product of claim 15 wherein the at least one new archive file comprises a single new archive file that is a subset of the plurality of object oriented classes in the at least one source archive file.

19. The program product of claim 18 wherein the archive maker determines dependencies among the remaining classes in the at least one source archive file, and includes all dependent classes in the single new archive file.

20. The program product of claim 15 wherein the archive maker processes a plurality of source archive files to generate a single new archive file that is a subset of the plurality of classes in the plurality of source archive files.

21. The program product of claim 15 wherein the archive maker partitions a single source archive file into a plurality of new archive files according to at least one predetermined partition criterion.

22. The program product of claim 21 wherein the at least one predetermined partition criterion includes maximum file size for each of the plurality of new archive files.

23. An apparatus comprising:

at least one processor;

a memory coupled to the at least one processor;

at least one source archive file residing in the memory, each source archive file including a plurality of object oriented classes;

an archive maker residing in the memory and executed by the at least one processor, the archive maker processing the at least one source archive file and writing at least one of the plurality of classes to at least one new archive file;

an object oriented computer program residing in the memory and executed by the at least one processor that references at least one class stored in the at least one new archive file;

the archive maker determining whether any classes required by the object oriented computer program are missing from the at least one new archive file, determining the location of missing classes, if any, in the at least one new archive file, and if there are missing classes, processing at least one archive file that contains at least one missing class.

24. A program product comprising:

an archive maker that processes at least one source archive file that includes a plurality of object oriented classes, the archive maker writing at least one of the plurality of classes to at least one new archive file, the archive maker determining whether any classes required by an object oriented computer program are missing from the at least one new archive file, determining the location of missing classes, if any, in the at least one new archive file, and if there are missing classes, processing at least one archive file that contains at least one missing class; and signal bearing media bearing the archive maker.

25. The program product of claim 24 wherein the signal bearing media comprises recordable media.

26. The program product of claim 24 wherein the signal bearing media comprises transmission media.

* * * * *